US010618190B2

(12) United States Patent
Senoo

(10) Patent No.: US 10,618,190 B2
(45) Date of Patent: Apr. 14, 2020

(54) CARDBOARD SHEET-CUTTING DEVICE WITH A MOVABLE MARK DETECTOR

(71) Applicant: MITSUBISHI HEAVY INDUSTRIES MACHINERY SYSTEMS, LTD., Hyogo (JP)

(72) Inventor: Shinichiro Senoo, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 92 days.

(21) Appl. No.: 15/742,838

(22) PCT Filed: Feb. 24, 2016

(86) PCT No.: PCT/JP2016/055489
§ 371 (c)(1),
(2) Date: Jan. 8, 2018

(87) PCT Pub. No.: WO2017/026135
PCT Pub. Date: Feb. 16, 2017

(65) Prior Publication Data
US 2018/0200906 A1    Jul. 19, 2018

(30) Foreign Application Priority Data

Aug. 10, 2015  (JP) ................................ 2015-158372

(51) Int. Cl.
*B62D 11/00* (2006.01)
*B26D 11/00* (2006.01)
(Continued)

(52) U.S. Cl.
CPC .............. *B26D 11/00* (2013.01); *B26D 5/007* (2013.01); *B26D 9/00* (2013.01); *B31F 7/00* (2013.01);
(Continued)

(58) Field of Classification Search
CPC ............ B65H 2553/81; B65H 2553/83; B65H 35/02; B65H 35/04; B65H 35/06;
(Continued)

(56) References Cited

U.S. PATENT DOCUMENTS 8,376,516 B2 * 2/2013 Viturro .................. B41J 29/393
347/43
2004/0182503 A1 * 9/2004 Stadele ................. B31F 1/2822
156/210

FOREIGN PATENT DOCUMENTS

CN        1532047 A      9/2004
EP        1459878 A2     9/2004
(Continued)

OTHER PUBLICATIONS

International Search Report and Written Opinion in PCT/JP2016/055489, dated May 17, 2016. 18pp.
(Continued)

*Primary Examiner* — Justin N Olamit
(74) *Attorney, Agent, or Firm* — Hauptman Ham, LLP

(57) ABSTRACT

Regarding a cardboard sheet-cutting device, a cardboard sheet-cutting control unit and a cardboard sheet-manufacturing apparatus, continuous cutting is made during job changes, in which the cardboard sheet cutting width changes, without stopping conveyance of the cardboard sheets, by a printing unit for printing cutting marks on a double-faced cardboard sheet; a slitter scorer for cutting the double-faced cardboard sheet to a specified width; a cutoff for cutting the double-faced cardboard sheet to a specified length; a mark detector for detecting cutting marks; a movement unit for moving the mark detector along the width direction of the double-faced cardboard sheet; and a cutting control unit for performing control to actuate the cutoff on the basis of the detection results of the mark detector and moving the mark detector using the movement (Continued)

unit on the basis of job-change timing data and post-job change mark position information.

13 Claims, 4 Drawing Sheets

(51) Int. Cl.
  *B31F 7/00* (2006.01)
  *B26D 9/00* (2006.01)
  *B26D 5/00* (2006.01)
  *B41J 11/00* (2006.01)
  *B41J 11/66* (2006.01)
  *B41J 11/68* (2006.01)
  *B41J 11/70* (2006.01)
(52) U.S. Cl.
  CPC .......... *B41J 11/0095* (2013.01); *B41J 11/663* (2013.01); *B41J 11/68* (2013.01); *B41J 11/70* (2013.01); *B26D 2011/005* (2013.01); *B32B 2317/12* (2013.01); *B65H 2553/81* (2013.01); *B65H 2553/83* (2013.01); *B65H 2701/1762* (2013.01); *G05B 2219/37336* (2013.01)
(58) Field of Classification Search
  CPC .......... B65H 35/08; B65H 43/08; B26D 5/30; B26D 5/32; B26D 5/34; B26D 5/36; B26D 11/00; B26D 11/005; B41J 11/663; B41J 11/68; B41J 11/70; B31B 50/14; B31B 50/16; B31B 50/18; B31F 2201/0792; B31F 2201/0794
  See application file for complete search history.

(56) References Cited

FOREIGN PATENT DOCUMENTS

| EP | 1602501 A2 | 12/2005 |
|---|---|---|
| JP | S4827674 B | 8/1973 |
| JP | 2000-202929 A | 7/2000 |
| JP | 2002-273800 A | 9/2002 |
| JP | 2003245894 A | 9/2003 |
| JP | 2004-82279 A | 3/2004 |
| JP | 2008-207345 A | 9/2008 |
| JP | 4216020 B | 1/2009 |
| KR | 1020140119017 A | 10/2014 |

OTHER PUBLICATIONS

Extended European Search Report for EP Application No. 16834833.2, dated Jun. 29, 2018, 8pp.
Office Action for Korean Application No. 1020187001018 dated Aug. 9, 2019; 13pp.
Office Action for Chinese Application No. 201680040552.2 dated Oct. 8, 2019; 16pp.
Office Action for Japanese Application No. 2015-158372 dated Nov. 11, 2019; 8pp.
Office Action for Japanese Application No. 2015-158372 dated Jun. 11, 2019; 10pp.
Office Action for Japanese Application No. 2015-158372 dated Nov. 19, 2019; 8pp.

* cited by examiner

CARDBOARD SHEET-CUTTING DEVICE WITH A MOVABLE MARK DETECTOR

RELATED APPLICATIONS

The present application is a National Phase of PCT/JP2016/055489, filed Feb. 24, 2016, and claims priority based on Japanese Patent Application No. 2015-158372, filed Aug. 10, 2015.

TECHNICAL FIELD

The present invention relates to a cardboard sheet-cutting device that cuts a cardboard sheet, in which a front liner, a corrugating medium subjected to waveform processing, and a back liner are bonded together, to a predetermined size, a cutting control unit for a cardboard sheet that controls the cutting device, and a cardboard sheet-manufacturing apparatus having the cardboard sheet-cutting device.

BACKGROUND ART

Corrugating machines serving as cardboard sheet-manufacturing apparatuses include a single facer that forms a single-faced cardboard sheet, and a double facer that bonds front liner paper to the single-faced cardboard sheet to form a double-faced cardboard sheet. The single facer processes a core paper (corrugating medium) into a waveform, bonds the back liner to form the single-faced cardboard sheet, and the double facer bonds the front liner to this single-faced cardboard sheet to form the double-faced cardboard sheet. A continuous double-faced cardboard sheet manufactured by this double facer is cut to a predetermined width by a slitter scorer, and is cut to a predetermined length by a cutoff device to form a cardboard sheet.

In these corrugating machines, a cutting mark for cutting to the predetermined length is printed on a front surface of the cardboard sheet, a detector detects this cutting mark, and the cutoff device operates on the basis of this detection results to cut the cardboard sheet to the predetermined length. As such corrugating machines, there is, for example, a corrugating machine described in the following PTL 1. In addition, in the manufacture of a cardboard sheet by the corrugating machine, in a case where this cutting mark is not printed, a preprint sheet to which a liner on which the cutting mark is printed is bonded may be used, or the cutting mark may be present on a back surface.

CITATION LIST

Patent Literature

[PTL 1] Specification of Europe Patent No. 1459878
[PTL 2] Japanese Unexamined Patent Application Publication No. 2004-082279

SUMMARY OF INVENTION

Technical Problem

Meanwhile, in a case where the preprint sheet is used, the cardboard sheet is cut to the predetermined width by the slitter score and then cut to the predetermined length by the cutoff device. In this case, when the slitter scorer cuts the cardboard sheet to the predetermined width, both end parts in a width direction in the cardboard sheet are cut off (trimmed) as unnecessary portions. Therefore, the cutting mark is printed inside the unnecessary portions in the width direction. However, if the cutting width of the cardboard sheet is changed, the width of the unnecessary portions changes and a printing position of the cutting mark shifts in the width direction. Therefore, there is a concern that a detector cannot detect the cutting mark.

In addition, as a device for moving the detector that detects a mark position, for example, there is one described in the above PTL 2. However, in this PTL 2, the device moves the mark detector when a printing machine has stopped before printing starts. For that reason, when the cutting width is changed during the manufacture of the cardboard sheet, it is difficult to move the mark detector without stopping the transport of the cardboard sheet.

The invention is to solve the above-described problems, and an object thereof is to provide a cardboard sheet-cutting device, a cutting control unit for a cardboard sheet, and a cardboard sheet-manufacturing apparatus that can continuously perform a cutting operation without stopping transport of a cardboard sheet during a job change in which the cutting width of the cardboard sheet is changed and can suppress generation of waste paper to reduce production costs.

Solution to Problem

A cardboard sheet-cutting device of the invention for achieving the above object includes a digital printing machine that prints a cutting mark on a cardboard sheet under transport; a first cutting machine that cuts the cardboard sheet under transport to a predetermined width in a longitudinal direction; a second cutting machine that cuts the cardboard sheet under transport to a predetermined length in a width direction; a mark detector that detects the cutting mark in the cardboard sheet under transport; and a control unit that controls operation of the first cutting machine and the second cutting machine and changes a control setting value of the mark detector on the basis of a change in printing image information.

Therefore, the digital printing machine prints the cutting mark on the cardboard sheet, the first cutting machine cuts the cardboard sheet to the predetermined width in the longitudinal direction, and if the mark detector detects the cutting mark, the second cutting machine cuts the cardboard sheet to the predetermined length in the width direction. In this case, if the printing image information is changed, the control unit changes the setting value for controlling the mark detector. As a result, a continuous cutting operation becomes possible without stopping the transport of the cardboard sheet, operation efficiency can be improved, and production costs can be reduced by suppressing generation of waste paper.

In the cardboard sheet-cutting device of the invention, the printing image information is information for changing a printing image printed on the cardboard sheet, and the control unit changes a control setting value of the mark detector on the basis of the changed printing image.

Therefore, if the printing image is changed, the setting value for controlling the mark detector is changed in accordance with the changed image. As a result, the control unit can continuously perform a cutting operation without stopping the transport of the cardboard sheet.

In the cardboard sheet-cutting device of the invention, a movement unit that moves the mark detector in the width direction of the cardboard sheet is provided, the printing image information is a cutting width, of the cardboard sheet to be cut by the first cutting machine, changed with a change in the printing image, the control setting value is a detected position detected by the mark detector, and the control unit moves the mark detector to a detected position after a change using the movement unit on the basis of the changed cutting width of the cardboard sheet.

Therefore, if the cardboard sheet cutting width is changed, the control unit moves the mark detector using the movement unit on the basis of the changed cutting width of the cardboard sheet. As a result, a continuous cutting operation becomes possible without stopping the transport of the cardboard sheet, the operation efficiency can be improved, and the production costs can be reduced by suppressing generation of waste paper.

In the cardboard sheet-cutting device of the invention, the printing image information is job change information for changing the cutting width of the cardboard sheet to be cut by the first cutting machine during the transport of the cardboard sheet, and when there is a job change, the control unit moves the mark detector using the movement unit on the basis of job-change timing data and mark position information after the job change.

Therefore, when there is a job change in which the cutting width of the cardboard sheet by the first cutting machine is changed, the control unit moves the mark detector using the movement unit on the basis of the job-change timing data and the mark position information after the job change. That is, the control unit moves the mark detector to a position based on the mark position information after the job change at a timing when there is the job change, with the cardboard sheet transported. For that reason, during the job change in which the cutting width of the cardboard sheet is changed, a continuous cutting operation becomes possible without stopping the transport of the cardboard sheet, and the operation efficiency can be improved. Additionally, the mark detector can be rapidly moved to a predetermined position during the job change, and the production costs can be reduced by suppressing generation of waste paper.

In the cardboard sheet-cutting device of the invention, the job-change timing data has data of a target printed sheet number in a predetermined job, the control unit switches from printing of the cutting mark corresponding to a job under execution by the digital printing machine to printing of the cutting mark corresponding to the next job if an actual printed sheet number of the cutting mark corresponding to the job under execution reaches the target printed sheet number, and moves the mark detector using the movement unit if the switching position of the cutting mark reaches the second cutting machine.

Therefore, if the switching position switched from the printing of the cutting mark corresponding to the job under execution to the printing of the cutting mark corresponding to the next job reaches the second cutting machine, the mark detector is moved by the movement unit. Accordingly, a cutting operation can be continuously performed without stopping the transport of the cardboard sheet even after the job change.

In the cardboard sheet-cutting device of the invention, the mark position information is printing position data of the cutting mark in the longitudinal direction of the cardboard sheet, and when there is a job change, the control unit moves the mark detector to a cutting mark detectable position after the job change using the movement unit.

Therefore, when there is a job change, the mark detector is moved to the cutting mark detectable position after the job change. Accordingly, a cutting operation of the cardboard sheet can be continuously performed even after the job change.

In the cardboard sheet-cutting device of the invention, when the first job is changed to the second job, an idle running length of the cardboard sheet is set in correspondence with a period for which the mark detector moves from a detectable position in the first job to a detectable position in the second job, and when there is a job change, the control unit controls a printing timing of the digital printing machine in accordance with the idle running length.

Therefore, when there is a job change, the printing timing of the digital printing machine is controlled in accordance with the idle running length of the cardboard sheet. Accordingly, a waste paper length corresponding to the idle running length of the cardboard sheet is defined by the cutting mark. As a result, non-defective products and defective products can be appropriately sorted, and the waste paper length of the cardboard sheet can be made as short as possible.

In the cardboard sheet-cutting device of the invention, an image of the cutting mark, a printing position of the cutting mark, a printing color of the cutting mark, a cutting width and a cutting length of the cardboard sheet, and a manufactured sheet number of the cardboard sheet are set as job data, and the control unit controls the digital printing machine, the first cutting machine, the second cutting machine, and the movement unit on the basis of the job data.

Therefore, the printing of the cutting mark onto the cardboard sheet, the cutting of the cardboard sheet, and the movement of the mark detector are performed on the basis of the job data. As a result, the control can be simplified.

In the cardboard sheet-cutting device of the invention, a cutting upper limit length obtained by adding a margin length to a cutting length of the cardboard sheet is set, and when the mark detector does not detect the cutting mark beyond the cutting upper limit length, the control unit operates the second cutting machine when the cutting mark exceeds the cutting upper limit length.

Therefore, the cardboard sheet is cut by the second cutting machine when the mark detector does not detect the cutting mark beyond the cutting upper limit length. Accordingly, even if a detection error of the cutting mark by the mark detector occurs, a continuous cardboard sheet is not transported to the downstream side, and there is no adverse effect on stacking, discharging, or the like of cardboard sheets.

In the cardboard sheet-cutting device of the invention, the printing image information is a printing color of the cutting mark, and the control unit corrects a detection result of the mark detector on the basis of the printing color of the cutting mark.

Therefore, the detection result of the mark detector is corrected on the basis of the printing color of the cutting mark. Accordingly, it is possible to eliminate non-detection of the mark detector resulting from a shade change in the cutting mark to improve detection accuracy.

In the cardboard sheet-cutting device of the invention, the control unit calculates a deviation between a target cutting length and an actual cutting length of the cardboard sheet.

Therefore, the deviation between the target cutting length and the actual cutting length of the cardboard sheet is calculated. Accordingly, the cutting accuracy of the cardboard sheet can be confirmed by this deviation.

In the cardboard sheet-cutting device of the invention, the control unit corrects printing data of the cutting mark using the digital printing machine when the deviation between the target cutting length and the actual cutting length exceeds a preset allowable value.

Therefore, the printing data of the cutting mark by the digital printing machine is corrected when the deviation between the target cutting length and the actual cutting length exceeds the allowable value. Accordingly, the printing position of the cutting mark by the digital printing machine can be changed in accordance with elongation or contraction of the cardboard sheet, and the cutting accuracy of the cardboard sheet can be improved.

In the cardboard sheet-cutting device of the invention, the digital printing machine is capable of printing a pattern on the cardboard sheet under transport, and uses at least a portion of the pattern as the cutting mark.

Therefore, the digital printing machine uses at least a portion of the pattern printed on the cardboard sheet as the cutting mark. Accordingly, it is not necessary to print an exclusive cutting mark, and printing costs can be reduced.

A cutting control unit for a cardboard sheet in a cardboard sheet-cutting device of the invention includes a digital printing machine that prints a cutting mark on a cardboard sheet under transport; a first cutting machine that cuts the cardboard sheet under transport to a predetermined width in a longitudinal direction; a mark detector that detects the cutting mark in the cardboard sheet under transport; and a second cutting machine that cuts the cardboard sheet under transport to a predetermined length in a width direction on the basis of a detection result of the mark detector. A control setting value of the mark detector is changed on the basis of printing image information.

Therefore, if the printing image information is changed, the setting value for controlling the mark detector is changed. As a result, a continuous cutting operation becomes possible without stopping the transport of the cardboard sheet, operation efficiency can be improved, and production costs can be reduced by suppressing generation of waste paper.

Additionally, a cardboard sheet-manufacturing apparatus of the invention includes a single facer that bonds a second liner to a core paper subjected to waveform processing to manufacture a single-faced cardboard sheet; a double facer that bonds a first liner to a core paper side in the single-faced cardboard sheet to manufacture a double-faced cardboard sheet; and the cardboard sheet-cutting device.

Therefore, the single facer bonds the second liner to the core paper subjected to the waveform processing to manufacture the single-faced cardboard sheet, and the double facer bonds the first liner to the corrugating medium side in the single-faced cardboard sheet manufactured by the single facer to manufacture the double-faced cardboard sheet. Additionally, the digital printing machine prints the cutting mark on the cardboard sheet, the first cutting machine cuts the cardboard sheet to the predetermined width in the longitudinal direction, and if the mark detector detects the cutting mark, the second cutting machine cuts the cardboard sheet to the predetermined length in the width direction. In this case, if the printing image information is changed, the setting value for controlling the mark detector is changed. As a result, a continuous cutting operation becomes possible without stopping the transport of the cardboard sheet, operation efficiency can be improved, and production costs can be reduced by suppressing generation of waste paper.

Advantageous Effects of Invention

According to the cardboard sheet-cutting device, the cutting control unit for a cardboard sheet, and the cardboard sheet-manufacturing apparatus of the invention, the control setting value of the mark detector is changed on the basis of the printing image information. Thus, a cutting operation can be continuously performed without stopping the transport of the cardboard sheet, and the production costs can be reduced by suppressing generation of waste paper.

DESCRIPTION OF EMBODIMENTS

Preferred embodiments of a cardboard sheet-cutting device, a cutting control unit for a cardboard sheet, and a cardboard sheet-manufacturing apparatus of the invention will be described below in detail with reference to the accompanying drawings. In addition, the invention is not limited to the embodiments and includes those configured by combining respective embodiments in a case where there are a plurality of embodiments.

Figure 1:
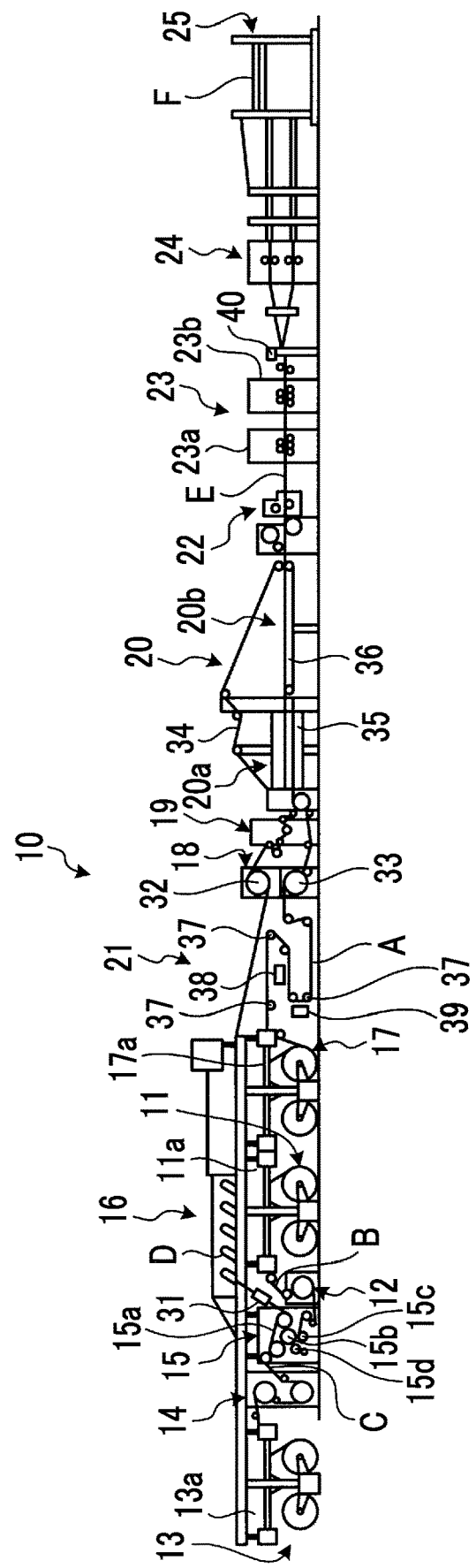
FIG. 1 is a schematic view illustrating a corrugating machine serving as a cardboard sheet-manufacturing apparatus of the present embodiment.

FIG. 1 is a schematic view illustrating a corrugating machine serving as a cardboard sheet-manufacturing apparatus of the present embodiment.

In the present embodiment, as illustrated in FIG. 1, the corrugating machine 10 serving as the cardboard sheet-manufacturing apparatus manufactures bonds, for example, a back liner C as a second liner to a corrugating medium (core paper) B subjected to waveform processing to manufacture a single-faced cardboard sheet D and bonds, for example, a front liner A as a first liner to a corrugating medium B side in the single-faced cardboard sheet D to manufacture a double-faced cardboard sheet E.

The corrugating machine 10 has a mill roll stand 11 for the corrugating medium B, and a preheater (preheating unit) 12, a mill roll stand 13 for the back liner C, a preheater (preheating unit) 14, a single facer 15, a bridge 16, a mill roll stand 17 for the front liner A, a preheater (preheating unit) 18, a glue machine 19, a double facer 20, a printing unit 21, a rotary shear 22, a slitter scorer 23, a cutoff 24, and a stacker 25.

Roll papers around which a core paper formed with the corrugating medium B is wound in the shape of a roll are respectively mounted on both sides of the mill roll stand 11, and a splicer (paper splicing unit) 11a that performs paper splicing is provided above the mill roll stand 11. In a case where paper is fed from one roll paper, the other roll paper is mounted and paper splicing preparation is performed. If a base paper of the one roll paper runs short, this paper is spliced to a base paper of the other roll paper by the splicer 11a. Then, while the base paper is supplied from the other roll paper, one roll paper is mounted and paper splicing preparation is performed. In this way, the base papers are sequentially spliced together, and are continuously delivered from the mill roll stand 11 toward a downstream side.

Meanwhile, roll papers around which the back liner C is wound in the shape of a roll are respectively mounted on both sides of the mill roll stand 13, and a splicer 13a that performs paper splicing is provided above the mill roll stand 13. In a case where paper is fed from one roll paper, the other roll paper is mounted and paper splicing preparation is performed. If a base paper of the one roll paper runs short, this paper is spliced to a base paper of the other roll paper by the splicer 13a. Then, while the base paper is supplied from the other roll paper, one roll paper is mounted and paper splicing preparation is performed. In this way, the base papers are sequentially spliced together, and are continuously delivered from the mill roll stand 13 toward the downstream side.

The respective preheaters 12 and 14 preheat the corrugating medium B and the back liner C, respectively. Each of the preheaters 12 and 14 has a heating roll into which steam is supplied, and raises the temperature of the base paper (the corrugating medium B or the back liner C) continuously delivered from the mill roll stand 11 or 13 to a predetermined temperature by winding the base paper around the heating roll to transport the base paper.

The single facer 15 has a pressing belt 15a, an upper stage roll 15b, and a lower stage roll 15c. The back liner C heated by the preheater 14 is transferred to a nip part between the pressing belt 15a and the upper stage roll 15b. Meanwhile, the corrugating medium B heated by the preheater 12 is transferred to the nip part between the pressing belt 15a and the upper stage roll 15b after being processed wavelike by an engagement part between the upper stage roll 15b and the lower stage roll 15c.

A gluing unit 15d is disposed in the vicinity of the upper stage roll 15b. The gluing unit 15d has a gluing roll that applies glue to the corrugating medium B. The corrugating medium B corrugated by the engagement part between the upper stage roll 15b and the lower stage roll 15c is glued at respective top parts of corrugations by the gluing unit 15d (gluing roll), and is bonded to the back liner C in the nip part between the pressing belt 15a and the upper stage roll 15b to form the single-faced cardboard sheet D.

A take-up conveyor 31 is provided obliquely above the single facer 15 on the downstream side in a transport direction. The take-up conveyor 31 consists of a pair of endless belts, and has a function of sandwiching the single-faced cardboard sheet D formed in the single facer 15 to transport the single-faced cardboard sheet D to the bridge 16. The bridge 16 functions as a retention part that primarily retains the single-faced cardboard sheet D in order to absorb a speed difference between the single facer 15 and the double facer 20.

Roll papers around which the front liner A is wound in the shape of a roll are respectively mounted on both sides of the mill roll stand 17, and a splicer 17a that performs paper splicing is provided above the mill roll stand 17. In a case where paper is fed from one roll paper, the other roll paper is mounted and paper splicing preparation is performed. If a base paper of the one roll paper runs short, this paper is spliced to a base paper of the other roll paper by the splicer 17a. Then, while the base paper is supplied from the other roll paper, one roll paper is mounted and paper splicing preparation is performed. In this way, the base papers are sequentially spliced together, and are continuously delivered from the mill roll stand 17 toward the downstream side.

The preheater 18 has a heating roll 32 for single-faced cardboard sheet D (hereinafter referred to as a single-faced cardboard sheet heating roll), and a heating roll 33 for the front liner A (hereinafter referred to as a front liner heating roll). The single-faced cardboard sheet heating roll 32 has a winding amount adjusting unit, is heated to a predetermined temperature by supplying steam thereinto, and is capable of preheating the single-faced cardboard sheet D by the back liner C side of the single-faced cardboard sheet D being wound around a peripheral surface thereof. Meanwhile, similarly, the front liner heating roll 33 also has a winding amount adjusting unit, is heated to a predetermined temperature by supplying steam thereinto, and is capable of preheating the front liner A by the front liner C being wound around a peripheral surface thereof.

The glue machine 19 has a gluing unit and a pressing unit. The single-faced cardboard sheet D heated by the single-faced cardboard sheet heating roll 32 is guided into the glue machine 19 on the way, and is glued on the respective top parts of the corrugations of the corrugating medium B when passing between a rider roll and the gluing roll.

The single-faced cardboard sheet D glued by the glue machine 19 is transferred to the double facer 20 of the next step. Additionally, the front liner A heated by the front liner heating roll 33 is also transferred to the double facer 20 through the glue machine 19.

The double facer 20 is divided into an upstream heating section 20a and a downstream cooling section 20b along a traveling line of the single-faced cardboard sheet D and the front liner A. The single-faced cardboard sheet D glued by the glue machine 19 is carried in between a pressing belt 34 and a hot plate 35 in the heating section 20a, and the front liner A is carried in between the pressing belt 34 and the hot plate 35 so as to overlap the corrugating medium B side of the single-faced cardboard sheet D. Then, the single-faced cardboard sheet D and the front liner A are carried in between the pressing belt 34 and the hot plate 35, are then integrated with each other in the state of overlapping each other, and are transferred toward the cooling section 20b. During this transfer, the single-faced cardboard sheet D and the front liner A are heated while being pressed, and are thereby bonded together to form a continuous double-faced cardboard sheet E. The double-faced cardboard sheet E is naturally cooled when being transported while being sandwiched between the pressing belt 34 and the transporting belt 36 in the cooling section 20b.

The printing unit 21 is disposed between the mill roll stand 17 and the preheater 18 to invert the front liner A and print a pattern and a cutting mark on a front surface of the front liner. The printing unit 21 has a plurality of inverting guide rollers 37, an ink jet printer 38 serving as a digital printing machine (variable printing machine) that performs color printing, and a dryer 39 that dries ink. In addition, the digital printing machine is a plateless type printing machine, an electronic printing device or the like may be used, not limited to the ink jet printer 38, and a drawing method does not matter. For that reason, the front liner A delivered from the mill roll stand 17 is temporarily inverted by the plurality of guide rollers 37 such that a front surface becomes an upper surface because a lower surface is the front surface. The ink jet head 38 color-prints the pattern and the cutting mark on the front surface (upper surface) of the inverted front liner A. In this case, only the cutting mark may be printed without printing the pattern. The dryer 39 dries the pattern and the cutting mark (ink) that are printed on the front surface of the front liner A.

The double-faced cardboard sheet E manufactured by the double facer 20 is transferred to the rotary shear 22. The rotary shear 22 cuts the double-faced cardboard sheet E over its full width or partially in a width direction in a case where bonding is stabilized in an initial operation stage. The slitter scorer 23 cuts a wide double-faced cardboard sheet E in the transport direction so as to have a predetermined width, and processes a ruled line that extends in the transport direction. The slitter scorer 23 consists of a first slitter scorer unit 23a and a second slitter scorer unit 23b that are arranged in the transport direction of the double-faced cardboard sheet E and have substantially the same structure. The first slitter scorer unit 23a and the second slitter scorer unit 23b have a plurality of pairs of upper ruled line rolls and lower ruled line rolls, which are disposed to face each other with double-faced cardboard sheet E therebetween, in the width direction, and have a plurality of slitter knives, which are disposed below the double-faced cardboard sheet E, in the width direction.

The cutoff 24 cuts the double-faced cardboard sheet E, which is cut in the transport direction by the slitter scorer 23, in the width direction, and forms a plate-shaped double-faced cardboard sheet F with a predetermined length. The cutoff 24 receives and processes two double-faced cardboard sheets E, which are cut to the predetermined width in the transport direction in the slitter scorer 23, into two upper and lower stages, and both have substantially the same configuration. Additionally, the cutoff 24 has a mark detector 40, and cuts the double-faced cardboard sheet E to the predetermined length in the width direction if the mark detector 40 detects the cutting mark printed on the double-faced cardboard sheet E (front liner A). The stacker 25 stacks the double-faced cardboard sheet F cut by the cutoff 24, and discharges the double-faced cardboard sheet F to the outside of the machine as a product.

Here, the cardboard sheet-cutting device of the present embodiment will be described. The cardboard sheet-cutting device of the present embodiment T is constituted by the printing unit 21, the slitter scorer (first cutting machine) 23, the cutoff (second cutting machine) 24, and the control unit, and if the mark detector 40 detects the cutting mark of the double-faced cardboard sheet E, the control unit is adapted to control the driving of the cutoff 24 to cut the double-faced cardboard sheet E to the predetermined length. Additionally, when there is a job change in which the cutting width of the double-faced cardboard sheet E by the slitter scorer 23 is changed during the transport of the double-faced cardboard sheet E, the control unit is adapted to move the mark detector 40 on the basis of job-change timing data and position information on the cutting mark after the job change.

Figure 2:
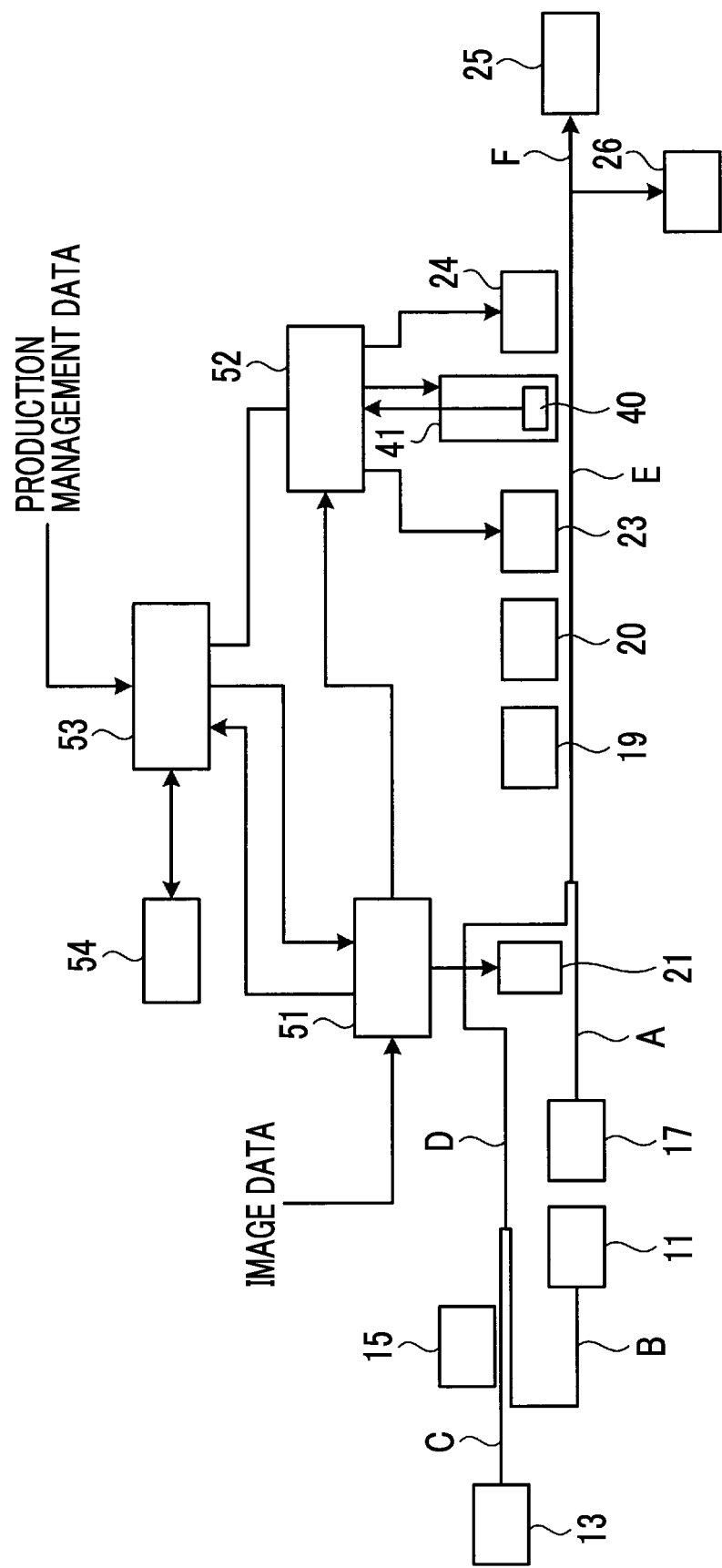
FIG. 2 is a schematic configuration view illustrating a cardboard sheet-cutting device of the present embodiment.

FIG. 2 is a schematic configuration view illustrating the cardboard sheet-cutting device of the present embodiment.

In the cardboard sheet-cutting device of the present embodiment, as illustrated in FIG. 2, the detected position of the cutting mark can be adjusted in the width direction of the double-faced cardboard sheet E as the mark detector 40 of the cutoff 24 is moved in the width direction of the double-faced cardboard sheet E by the movement unit 41.

The printing unit 21 has a printing control unit 51 connected thereto, and the printing control unit 51 is adapted to be capable of controlling the driving of the printing unit 21. The slitter scorer 23 and the cutoff 24 are connected to the cutting control unit 52, and the cutting control unit 52 is adapted to be capable of controlling the driving of the slitter scorer 23 and the cutoff 24. Additionally, the cutting control unit 52 has the mark detector 40 connected thereto, has information on the cutting mark detected by the mark detector 40 input thereto, and drives the cutoff 24 on the basis of this information. Moreover, the cutting control unit 52 has the movement unit 41 connected thereof and drives the movement unit 41 on the basis of the job-change timing data and the position information on the cutting mark after the job change.

The printing control unit 51 and the cutting control unit 52 are connected to each other, and is connected to a production management unit 53. For that reason, the printing control unit 51 and the cutting control unit 52 are capable of exchanging data (information) with each other, and the production management unit 53 is capable of exchanging data (information) with the printing control unit 51 and the cutting control unit 52. Additionally, the production management unit 53 has a data storage 54 connected thereof, and is capable of storing various kinds of input data or retrieving the stored data. The control unit of the present embodiment is constituted by the printing control unit 51, the cutting control unit 52, and the production management unit 53.

An image of the pattern, an image of the cutting mark, printing positions of the pattern and the cutting mark, printing colors of the pattern and the cutting mark, and the cutting width and the cutting length of the double-faced cardboard sheet, which constitute some of the job data, are set as image data, and this image data is input to the printing control unit 51. Additionally, the target manufactured sheet number (target printed sheet number) of double-faced cardboard sheets that constitutes some of the job data is set as production control data, and data of this target manufactured sheet number is input to the production management unit 53 and is stored in the data storage 54.

The printing control unit 51 controls the driving of the printing unit 21 on the basis of the input image data, and prints the pattern and the cutting mark using predetermined colors at predetermined positions in the front liner A. The printing control unit 51 outputs the input image data to the cutting control unit 52, and the cutting control unit 52, controls the driving of the slitter scorer 23 to cut the double-faced cardboard sheet E to the predetermined width, on the basis of this image data, controls the driving of the cutoff 24 to cut the double-faced cardboard sheet E to the predetermined length, on the basis of the cutting mark detected by the mark detector 40.

The production management unit 53 outputs the input production control data to the printing control unit 51, and the printing control unit 52 controls the driving of the printing unit 21 to print predetermined numbers of patterns and cutting marks on the front liner A, on the basis of this production control data.

Additionally, a plurality of kinds of the job data (target manufactured sheet number data) are input to the production management unit 53 and is stored in the data storage 54. For example, when a first job is terminated and transits to a second job, the mark detector 40 is moved by the movement unit 41 on the basis of the job-change timing data and the position data information on the cutting mark after the job change.

Here, the job-change timing data is target manufactured sheet number data (target printed sheet number data) corresponding to a job under execution, and the printing control unit 51 switches from a printing operation of the cutting mark corresponding to a job under execution by the printing unit 21 to a printing operation of the cutting mark corresponding to the next job if an actual printed sheet number of the cutting mark corresponding to the job under execution reaches the target printed sheet number. Then, the cutting control unit 52 moves the mark detector 40 by the movement unit 41 if a switching position of the cutting mark reaches the cutoff 24. Additionally, the mark position information is printing position data of the cutting mark in a longitudinal direction of the double-faced cardboard sheet E, and the cutting control unit 52 moves the mark detector 40 to a cutting mark detectable position after a job change using the movement unit 41 if the switching position of the cutting mark reaches the cutoff 24.

That is, the production management unit 53 ascertains the printing end timing of the last cutting mark (printing end time) in a job under execution by the printing unit 21. Additionally, the production management unit 53 ascertains the time until the cutting mark (the switching position of the cutting mark) reaches the cutoff 24 from the distance from the printing unit 21 to the cutoff 24 and the transport speed of the double-faced cardboard sheet E. For that reason, the cutting control unit 52 can calculate the timing (reaching time) that the switching position of the cutting mark reaches the cutoff 24, using the data from the production management unit 53. In addition, the cutoff 24 may have a counter and may detect that the actual manufactured sheet number of the cutting mark corresponding to a job under execution reaches the target manufactured sheet number from the number of times of operation of the cutoff 24.

Additionally, when the first job is changed to the second job, it is necessary to change the cutting width of the double-faced cardboard sheet E by the slitter scorer 23. Additionally, since it is necessary to change the cutting length of the double-faced cardboard sheet E by the cutoff 24, when the first job is changed to the second job, a switching time of the cutting positions of the slitter scorer 23 and the cutoff 24 are required. Additionally, in this case, the movement time for which the mark detector 40 is moved from the cutting mark detectable position in the first job to a cutting mark detectable position in the second job is required. For that reason, the double-faced cardboard sheet E runs idle while the switching time and the movement time elapse.

Thus, the idle running length of the double-faced cardboard sheet E is set in correspondence with the switching time and the movement time (idle running period). When the first job is changed to the second job, the printing control unit 51 controls the printing timing of the printing unit 21 in accordance with the idle running length of the double-faced cardboard sheet E. That is, if the actual printed sheet number according to the first job reaches the target printed sheet number, the printing control unit 51 starts printing according to the second job after the idle running length (switching position) of the double-faced cardboard sheet E is left, that is, an idle running region where a product is not produced is provided.

The idle running length of the double-faced cardboard sheet E is a fixed value. For example, a prescribed idle running length may be set in consideration of the aforementioned switching time and movement time, the transport speed of the double-faced cardboard sheet E, and the like, and the idle running length may be set to one time, two times, or the like the prescribed idle running length W with respect to the cutting length by the cutoff 24 in each job.

The mark detector 40 is, for example, a concentration sensor. The mark detector 40 measures the reflected light amount value from the front surface of the double-faced cardboard sheet E, and distinguishes an image line portion (solid printed portion) and a non-image line portion (blank portion) from each other on the basis of this reflected light amount value. The cutting control unit 52 has data of the cutting mark image (shape, dimension, color) in advance, and compares the length of the double-faced cardboard sheet E in the transport direction and the length of the cutting mark in the image line portion (solid printed portion) detected by the mark detector 40. Here, if the cutting control unit 52 determines that the detected image is the cutting mark, the double-faced cardboard sheet E is cut by the cutoff 24.

In addition, the cutting control unit 52 corrects a detection result of the mark detector 40 on the basis of the printing color of the cutting mark. That is, although the mark detector 40 measures the value of amount of reflected light from the front surface of the double-faced cardboard sheet E and the cutting control unit 52 distinguishes the image line portion and the non-image line portion from each other on the basis of the reflected light amount value, this reflected light amount value fluctuates according to the printing color. For that reason, the cutting control unit 52 changes a determination value for distinguishing the image line portion and the non-image line portion according to the printing color. That is, the sensitivity of the mark detector 40 is adjusted according to the printing color.

As described above, the mark detector 40 detects the image printed on the double-faced cardboard sheet E, and if the cutting control unit 52 determines that the detected image is the cutting mark, the double-faced cardboard sheet E is cut by the cutoff 24. However, if a detection error of the mark detector 40 or a determination error of the cutting control unit 52 occurs, the cutoff 24 does not cut the double-faced cardboard sheet E, and the double-faced cardboard sheet F longer (for example, 2 double length) than the predetermined length flows to the stacker 25, and a stacking detect occurs. For that reason, a cutting upper limit length obtained by adding a margin length to the cutting length of the double-faced cardboard sheet E is set. Thus, when the mark detector 40 does not detect the cutting mark beyond the cutting upper limit length, the cutting control unit 52 operates the cutoff 24 to cut the double-faced cardboard sheet E when the cutting mark exceeds the cutting upper limit length. In this case, data of the cutting length of the double-faced cardboard sheet F is input from the printing control unit 51 to the cutting control unit 52 on the basis of the cutting length of the image data. The cutting control unit 52 ascertains a transport length per a predetermined time from the transport speed of the double-faced cardboard sheet E. If the cutting control unit 52 determines the cutting mark beyond the predetermined time, the cutoff 24 is forcedly operated.

In addition, during a job change, the double-faced cardboard sheet E generated in correspondence with the idle running length of the double-faced cardboard sheet E becomes a defective double-faced cardboard sheet F. Since the production management unit 53 recognizes the idle running length of the double-faced cardboard sheet E, the cutoff 24 is forcedly operated if a region of the idle running length of this double-faced cardboard sheet E reaches the cutoff 24, a defective double-faced cardboard sheet F corresponding to the idle running length is removed from a transport line and is eliminated by a defect removal unit 26. Additionally, a defective double-faced cardboard sheet generated by forcedly operating the cutoff 24 is also eliminated by the defect removal unit 26 at the time of occurrence of a detection error of the mark detector 40 or a determination error of the cutting control unit 52.

In addition, in the aforementioned description, a case where the printing unit 21 prints the pattern and the cutting mark on the front surface of the front liner A has been described. However, at least a portion of the pattern may be used as the cutting mark without printing an exclusive cutting mark. Additionally, the front liner A having the pattern printed in advance on the front surface thereof may be used, and the printing unit 21 may print only the cutting mark in synchronization with the pattern printed in advance.

The cutting length (target cutting length) of the double-faced cardboard sheet F is input from the printing control unit 51 to the production management unit 53, the cutting length (actual cutting length) of the double-faced cardboard sheet F cut by operating the cutoff 24 from the cutting control unit 52 is input to the production management unit 53, and the production management unit 53 calculates and the deviation of the target cutting length and the actual cutting length of the double-faced cardboard sheet F. Then, the production management unit 53 corrects the printing data of the cutting mark using the printing unit 21 when the deviation between the target cutting length and the actual cutting length exceeds a preset allowable value.

Since the double-faced cardboard sheet E is subjected to processing, such as heating, gluing, pressing, and the like until the single-faced cardboard sheet D and front liner A are transported to the cutoff 24 after being pasted together, elongation or contraction occurs. Additionally, elongation or contraction occurs due to surrounding environments (temperature and humidity) or the like. Then, a distance between cutting marks when the printing unit 21 performs printing and a distance between cutting marks when the cutoff 24 performs cutting may be different from each other. For that reason the production management unit 53 corrects the printing dimension (for example, an enlargement ratio or a reduction ratio) of the cutting marks by the printing unit 21, when the deviation between the target cutting length and the actual cutting length exceeds the preset allowable value.

Figure 3:
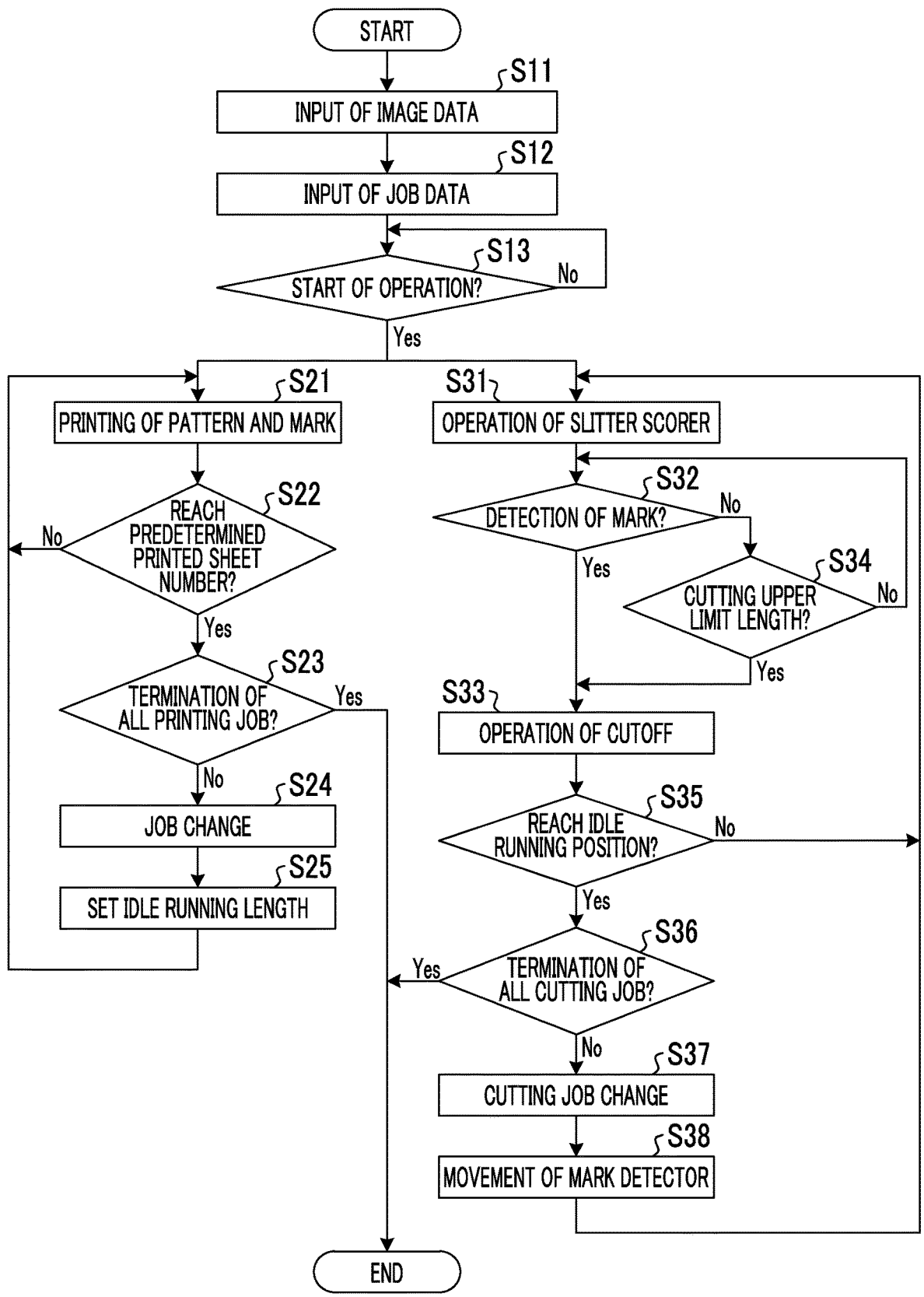
FIG. 3 is a flowchart illustrating cutting control during a job change.
Figure 4:
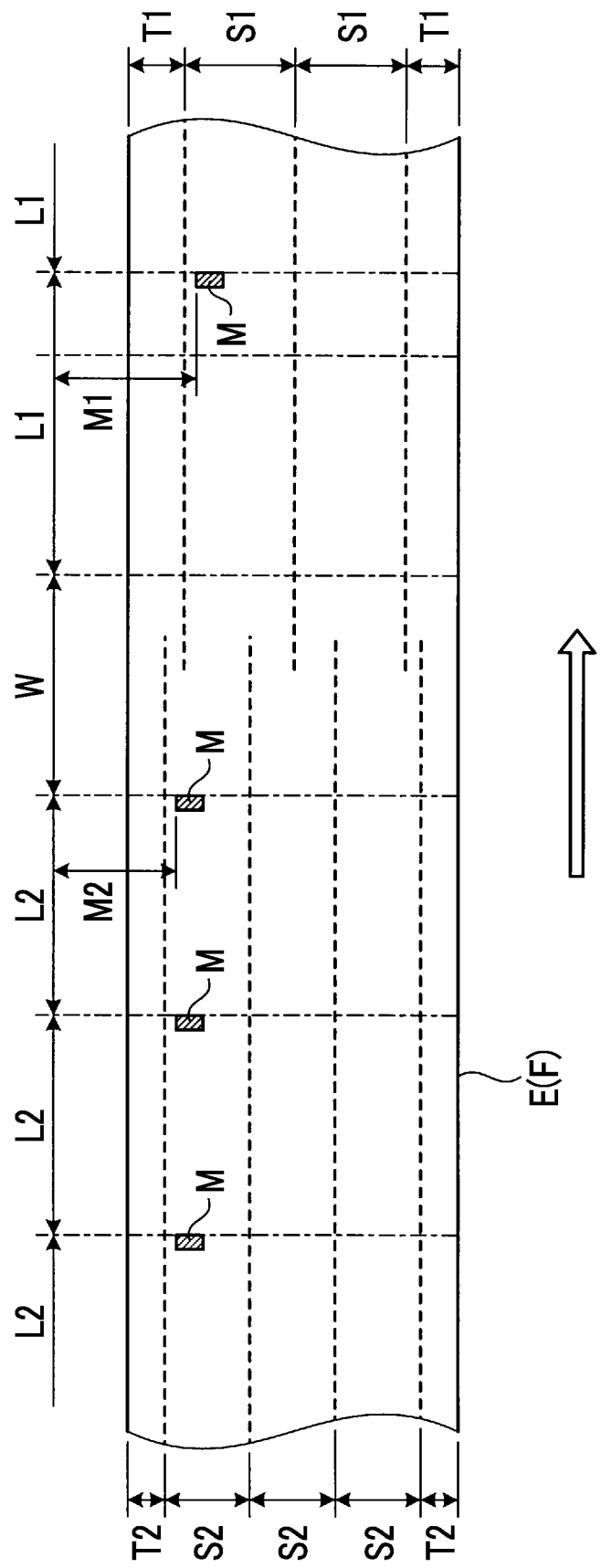
FIG. 4 is a plan view for explaining the cutting positions of cardboard sheets during a job change.

Hereinafter, the working of the cardboard sheet-cutting device of the present embodiment will be described. FIG. 3 is a flowchart illustrating the cutting control during a job change, and FIG. 4 is a plan view for explaining the cutting positions of cardboard sheets during a job change.

In the cardboard sheet-cutting device of the present embodiment, as illustrated in FIGS. 2 and 3, in Step S11, an image of the pattern, an image of the cutting mark, printing positions of the pattern and the cutting mark, printing colors of the pattern and the cutting mark, and the cutting width and the cutting length of the double-faced cardboard sheet E, which constitute some of job data, which serve as image data (job data) are input to the printing control unit 51. In Step S12, the manufactured sheet number (target manufactured sheet number) of double-faced cardboard sheets F serving as the production control data (job data) is input to the production management unit 53. In this case, a plurality of kinds of job data are input and stored in the data storage 54.

In Step S13, if a start command for a cardboard sheet manufacturing operation by the corrugating machine 10 is output to the production management unit 53 (Yes), cutting control is started by the printing control unit 51 and printing control is performed by the cutting control unit 52. On the other hand, if the start command for the cardboard sheet manufacturing operation by the corrugating machine 10 is not output to the production management unit 53 (No), the process stands by as it is.

In Step S21, the printing control unit 51 controls the printing unit 21, and the ink jet head 38 prints the pattern and the cutting mark on the front surface of the front liner A on the basis of the job data. On the other hand, the cutting control unit 52 controls the slitter scorer 23 in Step S31 on the basis of the job data, and the slitter scorer 23 cuts the double-faced cardboard sheet E to the predetermined width in the transport direction. In Step S32, the cutting control unit 52 determines the presence/absence of the cutting mark on the basis of the detection result from the mark detector 40. Here, if the cutting control unit 52 detects the cutting mark (Yes), in Step S33, the cutoff 24 is controlled and the cutoff 24 cuts the double-faced cardboard sheet E to the predetermined length in the width direction to form the double-faced cardboard sheet F.

On the other hand, in Step S32, if the cutting control unit 52 does not detect the cutting mark (No), it is determined in Step S34 whether or not a length (double-faced cardboard sheet transport length) by which the double-faced cardboard sheet E is transported exceeds the cutting upper limit length after the cutoff 24 performs cutting. Here, if it is determined that the double-faced cardboard sheet transport length does not exceed the cutting upper limit length (No), the process returns to Step S32. On the other hand, if it is determined that the double-faced cardboard sheet transport length has exceeded the cutting upper limit length (Yes), in Step S33, a defective double-faced cardboard sheet F is formed as the cutoff 24 cuts the double-faced cardboard sheet E.

In Step S22, it is determined whether the actual number of sheets printed by the printing unit 21 has reached the target printed sheet number. Here, if it is determined that the actual printed sheet number does not reach the target printed sheet number (No), the process returns to Step S21. On the other hand, if it is determined that the actual printed sheet number has reached the target printed sheet number (Yes), it is determined in Step S23 whether or not all the printing job is terminated. Here, if it is determined that all the printing job is not terminated (No), the printing job is changed in Step S24. Then, in Step S25, the process returns to Step S21 after the idle running length of the double-faced cardboard sheet E is set, and the following printing job is executed. That is, after a non-printed region corresponding to the idle running length is secured from the printing position of the cutting mark printed by the printing unit 21 corresponding to a job under execution, the cutting mark corresponding to the next job is printed. On the other hand, in Step S23, if it is determined that all the printing job has been terminated (Yes), the printing operation is terminated.

Additionally, in Step S35, it is determined whether or not the switching position (idle running length/non-printed region) of the cutting mark of the job under execution and the next job has reached the cutoff 24. Here, if it is determined that the switching position of the cutting mark does not reach the cutoff 24 (No), the process returns to Step S31. On the other hand, if it is determined that the switching position of the cutting mark has reached the cutoff 24 (Yes), it is determined in Step S36 whether all the cutting jobs are terminated. Here, if it is determined that all cutting jobs are not terminated (No), a cutting job is changed in Step S37. Then, in Step S38, the process returns to Step S31 after the position of the mark detector 42 is changed, and the next cutting job is executed. On the other hand, in Step S36, if it is determined that all the cutting job has been terminated (Yes), the printing operation is terminated.

Here, the timing of job changes in the cardboard sheet-cutting device of the present embodiment will be described.

As illustrated in FIG. 4, the first job is to cut a continuous double-faced cardboard sheet E to a trim width T1 from each end part in the width direction using the slitter scorer 23, cuts the continuous double-faced cardboard sheet E to a cutting width S1, and cuts the continuous double-faced cardboard sheet E to a cutting length L1 using the cutoff 24. Then, the first job is to print the cutting mark M at a position of the cutting length L1 and at a position of a width M1 from one end part in the width direction on the continuous double-faced cardboard sheet E. Meanwhile, the second job is to cut the continuous double-faced cardboard sheet E to a trim width T2 from each end part in the width direction using the slitter scorer 23, cuts the continuous double-faced cardboard sheet E to a cutting width S2, and cuts the continuous double-faced cardboard sheet E to a cutting length L2 using the cutoff 24. Then, the second job is to print the cutting mark M at a position of the cutting length L2 and at a position of a width M2 from one end part in the width direction on the continuous double-faced cardboard sheet E. Then, an idle running length W of the continuous double-faced cardboard sheet E is set.

When the actual printed sheet number of the printing unit 21 by the first job reaches the target printed sheet number and a change to the second job is made, printing of a first cutting mark M in the second job is started with the idle running length W left after the printing unit 21 prints the last cutting mark M. Meanwhile, when the switching position of the cutting mark M reaches the cutoff 24 and a change to the second job is made, while the double-faced cardboard sheet E is transported by the idle running length W, a cutting position in the width direction by the slitter scorer 23 and a cutting position in the length direction by the cutoff 24 are changed, and the mark detector 40 is moved to a position where the cutting mark M in the second job is detectable.

In addition, in FIG. 4, the idle running length W is set to a length approximated to one sheet with the cutting length L2. However, since a substantial time is taken for the movement of the mark detector 40 depending on the position of the cutting mark M, the idle running length W is not limited this. Since a defective double-faced cardboard sheet F with the idle running length W is removed after being cut in the cutoff 24, for example, the idle running length W may be a length equivalent to a plurality of sheets to be cut by the cutoff 24.

In this way, the cardboard sheet-cutting device of the present embodiment is provided with the printing unit 21 that prints the cutting mark M on the double-faced cardboard sheet E, the slitter scorer 23 that cuts the double-faced cardboard sheet E to the predetermined width, the cutoff 24 that cuts the double-faced cardboard sheet E to the predetermined length, the mark detector 40 that detects the cutting mark M in double-faced cardboard sheet E, and the cutting control unit 52 that changes a control setting value of the mark detector 40 on the basis of printing image information.

Therefore, the printing unit 21 prints the cutting mark M on the front liner A, the slitter scorer 23 cuts the double-faced cardboard sheet E to the predetermined width in the longitudinal direction, and if the mark detector 40 detects the cutting mark M, the cutoff 24 cuts the double-faced cardboard sheet E to the predetermined length in the width direction. In this case, if the printing image information is changed, the cutting control unit 52 changes the setting value for controlling the mark detector 40. As a result, a continuous cutting operation becomes possible without stopping the transport of the double-faced cardboard sheet E, the operation efficiency can be improved, and the production costs can be reduced by suppressing generation of waste paper.

In the cardboard sheet-cutting device of the present embodiment, the printing image information is information for changing a printing image printed on the double-faced cardboard sheet E, and the cutting control unit 52 changes the control setting value of the mark detector 40 on the basis of the changed printing image. Therefore, a cutting operation can be continuously performed without stopping the transport of the double-faced cardboard sheet E.

In the cardboard sheet-cutting device of the present embodiment, the movement unit 41 that moves the mark detector 40 in the width direction of the double-faced cardboard sheet E is provided, the printing image information is set to the cutting width, of the double-faced cardboard sheet E to be by the slitter scorer 23, which is changed with a change in the printing image, and the control setting value is set to a detected position detected by the mark detector 40. The cutting control unit 52 moves the mark detector 40 to a detected position after a change using the movement unit 41 on the basis of the changed cutting width of the double-faced cardboard sheet E. Therefore, a continuous cutting operation becomes possible without stopping the transport of the double-faced cardboard sheet E, the operation efficiency can be improved, and the production costs can be reduced by suppressing generation of waste paper.

In the cardboard sheet-cutting device of the present embodiment, the printing image information is job change information in which the cutting width of the double-faced cardboard sheet E by the slitter scorer 23 is changed during the transport of the double-faced cardboard sheet E, and when there is a job change, the cutting control unit 52 moves the mark detector 40 using the movement unit 41 on the basis of the job-change timing data and the mark position information after the job change. Therefore, when there is a job change in which the cutting width of the double-faced cardboard sheet E by the slitter scorer 23 is changed, the cutting control unit 52 moves the mark detector 40 using the movement unit 41 on the basis of the job-change timing data and the mark position information after the job change. That is, the cutting control unit 52 moves the mark detector 40 to a position based on the mark position information after the job change at a timing when there is the job change, with the double-faced cardboard sheet E transported. For that reason, during the job change in which the cutting width of the double-faced cardboard sheet E is changed, a continuous cutting operation becomes possible without stopping the transport of the double-faced cardboard sheet E, and the operation efficiency can be improved. Additionally, the mark detector 40 can be rapidly moved to a predetermined position during the job change, and the production costs can be reduced by suppressing generation of waste paper.

In the cardboard sheet-cutting device of the present embodiment, the job-change timing data is data of a target printed sheet number in a predetermined job, and the printing control unit 51 switches from printing of the cutting mark M corresponding to a job under execution by the printing unit 21 to printing of the cutting mark M corresponding to the next job if an actual printed sheet number of the cutting mark M corresponding to the job under execution reaches the target printed sheet number, and moves the mark detector 40 using the movement unit 41 if the switching position of the cutting mark M reaches the cutoff 24. Therefore, a cutting operation can be continuously performed even after a job change without stopping the transport of the double-faced cardboard sheet E.

In the cardboard sheet-cutting device of the present embodiment, the mark position information is printing position data of the cutting mark M in the longitudinal direction of the double-faced cardboard sheet E, and when there is a job change, the cutting control unit 52 moves the mark detector 40 to a cutting mark M detectable position after the job change using the movement unit 41. Therefore, a cutting operation of the double-faced cardboard sheet E can be continuously performed even after the job change.

In the cardboard sheet-cutting device of the present embodiment, when the first job is changed to the second job, the idle running length of the double-faced cardboard sheet E is set in correspondence with a period for which the mark detector 40 moves from the detectable position in the first job to the detectable position in the second job, and when there is a job change, the printing control unit 51 controls the printing timing of the printing unit 21 in accordance with the idle running length W of the double-faced cardboard sheet E. Therefore, a waste paper length corresponding to the idle running length W of the double-faced cardboard sheet E is defined by the cutting mark M. As a result, non-defective products and defective products can be appropriately sorted, and the waste paper length of the double-faced cardboard sheet E can be made as short as possible.

In the cardboard sheet-cutting device of the present embodiment, an image of the cutting mark M, and the printing position of the cutting mark M, the printing color of the cutting mark M, the cutting width and the cutting length of the double-faced cardboard sheet E and the manufactured sheet number of double-faced cardboard sheet F are set as the job data. Therefore, the printing control unit 51 controls the printing unit 21 on the basis of the job data, and the cutting control unit 52 controls the slitter scorer 23, the cutoff 24, and the movement unit 41. Therefore, the printing of the cutting mark M onto the front liner A, the cutting of the double-faced cardboard sheet E, and the movement of the mark detector 40 are performed on the basis of the job data. As a result, the control can be simplified.

In the cardboard sheet-cutting device of the present embodiment, the cutting upper limit length obtained by adding the margin length to the cutting length of the double-faced cardboard sheet E is set. Thus, when the mark detector 40 does not detect the cutting mark M beyond the cutting upper limit length, the cutting control unit 52 operates the cutoff 24 when the cutting mark exceeds the cutting upper limit length. Therefore, even if a detection error of the cutting mark M by the mark detector 40 occurs, a continuous double-faced cardboard sheet E is not transported to the stacker 25 side, and there is no adverse effect on stacking, discharging, or the like of double-faced cardboard sheets F.

In the cardboard sheet-cutting device of the present embodiment, the cutting control unit 52 corrects a detection result of the mark detector 40 on the basis of the printing color of the cutting mark M. Therefore, it is possible to eliminate non-detection of the mark detector 40 resulting from a shade change in the cutting mark M to improve detection accuracy.

In the cardboard sheet-cutting device of the present embodiment, the cutting control unit 52 calculates the deviation between the target cutting length and the actual cutting length of the double-faced cardboard sheet E. Therefore, the cutting accuracy of the double-faced cardboard sheet F can be confirmed from the deviation between the target cutting length and the actual cutting length of the double-faced cardboard sheet E.

In the cardboard sheet-cutting device of the present embodiment, the cutting control unit 52 corrects the printing data of the cutting mark M by the printing unit 21, when the deviation between the target cutting length and the actual cutting length of the double-faced cardboard sheet E exceeds a preset allowable value. Therefore, the printing position of the cutting mark M by the printing unit 21 can be changed in accordance with elongation or contraction of the double-faced cardboard sheet E, and the cutting accuracy of the double-faced cardboard sheet F can be improved.

In the cardboard sheet-cutting device of the present embodiment, the printing unit 21 can print the pattern on the double-faced cardboard sheet E under transport, and uses at least a portion of the pattern as the cutting mark M. Therefore, it is not necessary to print an exclusive cutting mark M, and printing costs can be reduced.

Additionally, in the cutting control unit for a cardboard sheet of the present embodiment, the operation of the cutoff 24 is controlled on the basis of a detection result of the mark detector 40, and when there is a job change in which the cutting width of the double-faced cardboard sheet F is changed, the mark detector 40 is moved by the movement unit 41 on the basis of the job-change timing data and the mark position information after the job change.

Therefore, when there is a job change in which the cutting width of the double-faced cardboard sheet E by the cutoff 24 is changed, the mark detector 40 is moved by the movement unit 41 on the basis of the job-change timing data and the mark position information after the job change. For that reason, during the job change in which the cutting width of the double-faced cardboard sheet E is changed, a continuous cutting operation becomes possible without stopping the transport of the double-faced cardboard sheet E, and the operation efficiency can be improved. Additionally, the mark detector 40 can be rapidly moved to a predetermined position during the job change, and the production costs can be reduced by suppressing generation of waste paper.

Additionally, the cardboard sheet-manufacturing apparatus of the present embodiment is provided with the single facer 15 that bonds the back liner C to the core paper (corrugating medium B) subjected to the waveform processing to manufacture the single-faced cardboard sheet D, and the double facer 20 that bonds the front liner A to the corrugating medium B side in the single-faced cardboard sheet D manufactured by the single facer 15 to manufacture the double-faced cardboard sheet E and is provided with the cutting control unit 52 that controls the operation of the cutoff 24 on the basis of a detection result of the mark detector 40 and moves the mark detector 40 using the movement unit 41 on the basis of the job-change timing data and the mark position information after the job change when there is job change in which the cutting width of the double-faced cardboard sheet F is changed.

Therefore, the single facer 15 bonds the back liner C to the core paper (corrugating medium B) subjected to the waveform processing to manufacture the single-faced cardboard sheet D, and the double facer 20 bonds the front liner A to the corrugating medium B side in the single-faced cardboard sheet D to manufacture the double-faced cardboard sheet E. In this case, the printing unit 21 prints the cutting mark M on the front liner A, the slitter scorer 23 cuts the double-faced cardboard sheet E to the predetermined width in the longitudinal direction, and if the mark detector 40 detects the cutting mark M, the cutoff 24 cuts the double-faced cardboard sheet E to the predetermined length in the width direction. Then, when there is a job change in which the cutting width of the double-faced cardboard sheet E by the cutoff 24 is changed, the mark detector 40 is moved by the movement unit 41 on the basis of the job-change timing data and the mark position information after the job change. That is, the cutting control unit 52 moves the mark detector 40 to a position based on the mark position information after the job change at a timing when there is the job change, with the double-faced cardboard sheet E transported. For that reason, during the job change in which the cutting width of the double-faced cardboard sheet E is changed, a continuous cutting operation becomes possible without stopping the transport of the double-faced cardboard sheet E, and the operation efficiency can be improved. Additionally, the mark detector 40 can be rapidly moved to a predetermined position during the job change, and the production costs can be reduced by suppressing generation of waste paper.

In addition, the above-described embodiment is configured such that the concentration sensor is used as the mark detector 40, the image line portion and the non-image line portion are distinguished from each other in accordance with the value of amount of reflected light from the front surface of the double-faced cardboard sheet E, and the presence/absence of the cutting mark M is determined. However, the invention is not limited to this configuration. For example, various sensors, such as a laser sensor, CCD cameras, or the like, may be applied instead of the concentration sensor.

Additionally, the above-described embodiment is configured such that the cutting marks M are printed at the positions of the cutting lengths L1 and L2 and at the positions of the widths M1 and M2 from an end part in the width direction of the double-faced cardboard sheet E. However, the printing positions of the cutting marks M are not limited to these positions. For example, the cutting marks M may be printed at positions shifted in the length direction of the double-faced cardboard sheet E from the positions of the cutting lengths L1 and L2. Additionally, the number of printed cutting marks M is also not limited to one, and a plurality of cutting marks may be printed.

REFERENCE SIGNS LIST

10: CORRUGATING MACHINE (CARDBOARD SHEET-MANUFACTURING APPARATUS)
11: MILL ROLL STAND
12: PREHEATER
13: MILL ROLL STAND
14: PREHEATER
15: SINGLE FACER
16: BRIDGE
17: MILL ROLL STAND
18: PREHEATER
19: GLUE MACHINE
20: DOUBLE FACER
21: PRINTING UNIT
22: ROTARY SHEAR
23: SLITTER SCORER (FIRST CUTTING MACHINE)
24: CUTOFF (SECOND CUTTING MACHINE)
25: STACKER
38: INK JET HEAD
39: DRIER
40: MARK DETECTOR
41: MOVEMENT UNIT
51: PRINTING CONTROL UNIT
52: CUTTING CONTROL UNIT
53: PRODUCTION MANAGEMENT UNIT
54: DATA STORAGE
A: FRONT LINER (FIRST LINER)
B: CORRUGATING MEDIUM
C: BACK LINER (SECOND LINER)
D: SINGLE-FACED CARDBOARD SHEET
E, F: DOUBLE-FACED CARDBOARD SHEET

The invention claimed is:

1. A cardboard sheet-cutting device comprising:
an ink jet printer configured to print a cutting mark on a cardboard sheet under transport;
a slitter scorer configured to cut the cardboard sheet under transport to a predetermined width in a longitudinal direction;
a cutoff configured to cut the cardboard sheet under transport in a width-direction and produce the cardboard sheet with a predetermined length;
a mark detector configured to detect the cutting mark in the cardboard sheet under transport; and
a controller configured to control the cutting of the slitter scorer and the cutoff and change a control setting value of the mark detector on a basis of a change in printing image information, wherein
the printing image information is a cutting width of the cardboard sheet to be cut by the slitter scorer according to the change in the printing image, and
the control setting value is a detection position where the mark detector is capable to detect the cutting mark after the change, and
the controller is configured to change the control setting value of the mark detector on the basis of the changed printing image information, while the cardboard sheet is transported.

2. The cardboard sheet-cutting device according to claim 1,
wherein the printing image information is job change information for changing the cutting width of the cardboard sheet to be cut by the slitter scorer during the transport of the cardboard sheet.

3. The cardboard sheet-cutting device according to claim 2,
wherein the job-change timing data includes data of a target printed sheet number in a predetermined job,
the controller is configured to cause the ink jet printer to switch from printing the cutting mark of a job under execution to printing the cutting mark of the next job when an actual printed sheet number of the cutting mark of the job under execution reaches the target printed sheet numbed.

4. The cardboard sheet-cutting device according to claim 2,
wherein the mark position information is printing position data of the cutting mark in the longitudinal direction of the cardboard sheet.

5. The cardboard sheet-cutting device according to claim 1,
wherein, when printing image information of a first job is changed to printing image information of a second job,
an idle running length of the cardboard sheet is set in correspondence with a period for which the mark detector moves from a position where the mark detector is configured to detect a cutting mark of the first job to a position where the mark detector is configured to detect a cutting mark of the second job, and
when the first job changes to the second job, the controller is configured to cause the ink jet printer to control a printing timing of the print the cutting mark in accordance with the idle running length.

6. The cardboard sheet-cutting device according to claim 1,
wherein job data includes an image of the cutting mark, a printing position of the cutting mark, a printing color of the cutting mark, a cutting width and a cutting length of the cardboard sheet, and a manufactured sheet number of the cardboard sheet, and
the controller is configured to control the ink jet printer, the slitter scorer, and the cutoff on a basis of the job data.

7. The cardboard sheet-cutting device according to claim 6,
wherein a cutting upper limit length is a length that adds a margin length to the cutting length of the cardboard sheet is set, and
when the mark detector does not detect the cutting mark beyond the cutting upper limit length and the cutting mark exceeds the cutting upper limit length, the controller is configured to operate the cutoff.

8. The cardboard sheet-cutting device according to claim 6,
wherein the printing image information is the printing color of the cutting mark, and the controller is configured to correct a detection result of the mark detector on the basis of the printing color.

9. The cardboard sheet-cutting device according to claim 1,
wherein the controller is configured to calculate a deviation between a target cutting length and an actual cutting length of the cardboard sheet.

10. The cardboard sheet-cutting device according to claim 9,
wherein the controller is configured to correct printing data of the cutting mark using the ink jet printer when the deviation exceeds a preset allowable value.

11. The cardboard sheet-cutting device according to claim 1,
wherein the ink jet printer is configured to print a pattern on the cardboard sheet under transport, and at least a portion of the pattern is used as the cutting mark.

12. A cutting controller for a cardboard sheet in a cardboard sheet-cutting device, the cardboard sheet-cutting device comprising:
an ink jet printer configured to print a cutting mark on a cardboard sheet under transport;
a slitter scorer configured to cut the cardboard sheet under transport to a predetermined width in a longitudinal direction;
a mark detector configured to detect the cutting mark in the cardboard sheet under transport; and
a cutoff configured to cut the cardboard sheet under transport in a width-direction and produce the cardboard sheet with a predetermined length,
wherein the controller is configured to:
change a control setting value of the mark detector based on a change in printing image information, the printing image information comprises a cutting width of the cardboard sheet to be cut by the slitter scorer according to the change in the printing image information, the control setting value comprises a detection position where the mark detector is configured to detect the cutting mark after the change; and
change the control setting value of the mark detector based on the changed printing image information, while the cardboard sheet is transported.

13. A cardboard sheet-manufacturing apparatus comprising:
a single facer configured to bond a second liner to a core paper subjected to waveform processing to manufacture a single-faced cardboard sheet;
a double facer configured to bond a first liner to a core paper side in the single-faced cardboard sheet to manufacture a double-faced cardboard sheet; and
the cardboard sheet-cutting device according to claim 1.

* * * * *